Jan. 9, 1934.   G. S. COATS   1,942,745
UNIVERSAL DRIVING CONNECTION
Filed July 11, 1932
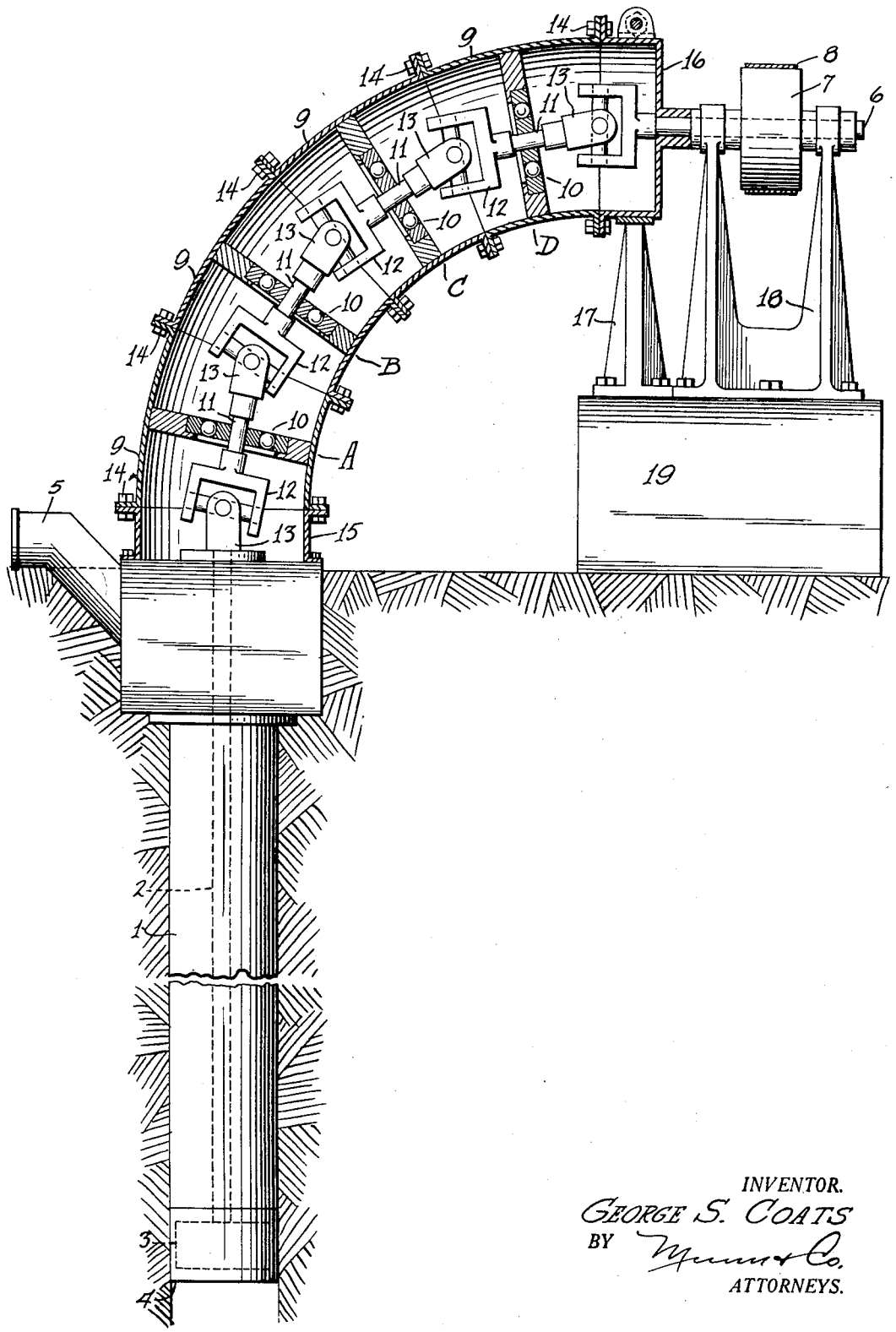
INVENTOR.
GEORGE S. COATS
BY
ATTORNEYS.

Patented Jan. 9, 1934

1,942,745

UNITED STATES PATENT OFFICE 1,942,745

UNIVERSAL DRIVING CONNECTION

George S. Coats, Visalia, Calif.

Application July 11, 1932. Serial No. 621,994

6 Claims. (Cl. 64—30)

My invention relates to improvements in universal driving connections, and it consists of the combinations, constructions and arrangements hereinafter described and claimed.

An object of my invention is to provide a universal driving connection which is especially designed to connect the vertical shaft of a deep well pump with a horizontal driving shaft. In deep well pumps it is now the practice to either align a vertically disposed motor shaft with the pump shaft and connect the two shafts together, or mount a pulley on the pump shaft and connect this pulley with a driving pulley by a belt. It is difficult to stand a motor on end and if a belt drive is resorted to, a lateral strain is placed on the pump shaft.

A further object of my invention is to provide a device of the type described that is simple in construction and in which each unit is identical so that any number of units can be attached to each other for connecting two shafts together that extend at an angle with respect to each other.

Other objects and advantages will appear in the following specification, and the novel features of the device will be particularly pointed out in the appended claims.

My invention is illustrated in the accompanying drawing forming a part of this application, in which The figure is a sectional view of the device showing it operatively connecting a horizontal driving shaft with a vertical deep well pump shaft.

In carrying out my invention I make use of a deep well pump comprising a casing indicated generally at 1, and having a vertical shaft 2, an impeller 3, a water inlet 4 and a water outlet 5. Instead of disposing the driving shaft of a motor in a vertical position, I have shown a horizontal driving shaft 6 that may be a motor shaft or may have a pulley 7 mounted thereon, this pulley being connected to a driving pulley, (not shown), by a belt 8.

The shaft 2 is connected to the shaft 6 by my universal driving connection. The device comprises a number of similar units that are rigidly connected to one another. Since each unit is identical to every other unit, a description of one will suffice.

The unit A consists of an arcuate casing 9 that supports a ball race 10, which in turn carries a shaft 11. The shaft 11 has one member of a universal joint mounted at each end. These members are numbered 12 and 13 respectively. The member 12 is connected to a member 13 disposed at the top of the shaft 2.

I have shown four units A, B, C and D, and the casings 9 of these units are secured together by bolts 14 or other suitable fastening means. The casing of the unit A is secured to a casing 15, which in turn is fastened to the well casing 1, while the casing of the unit D is secured to an end casing 16. It is obvious that as many units as desired may be secured to each other even to the extent of forming a complete circle.

The units may also be used to connect shafts together that are used for purposes other than deep well pumps. The units provide a rigid casing with a flexible driving shaft on the inside thereof.

I have shown the end casing 16 supported by a bracket 17 and the shaft 6 supported by a bearing 18, both the bracket and bearing being mounted on a block 19.

From the foregoing description of the various parts of the device, the operation thereof may be readily understood.

The driving shaft 6 will rotate the deep well pump shaft 2 through the universal joints 12 and 13 without causing any lateral strain on the shaft 2. There is no need to stand the driving shaft on end, neither is it necessary to connect a pulley mounted on the vertical shaft 2 with a driving pulley having an axis disposed in a horizontal position. The device is simple in construction, and answers a real need.

While I have shown only the preferred form of my invention, it should be understood that various changes or modifications may be made within the scope of the appended claims without departing from the spirit of the invention.

I claim:

1. The combination with the impeller shaft of a deep well pump, of a plurality of rigid housings rigidly connected together for universal joints, universal joints disposed in the housings and being connected together and to the shaft, the universal joints being disposed in the plane of the joining of the housings, and a horizontally disposed driving shaft operatively connected to the impeller shaft by the universal joints.

2. In combination, two shafts extending at an angle with respect to each other, universal joint housings rigidly connected together and extending between adjacent ends of the shafts, and universal joints mounted in the housings and being connected to each other and to the shafts, said universal joints being disposed in the plane of the joining of the housings.

3. An article of manufacture comprising a housing with ends that are inclined with respect to each other, a ball race disposed therein, a shaft carried by the ball race and having universal joint elements disposed at each end.

4. An article of manufacture comprising a housing with ends that are inclined with respect to each other, a ball race disposed therein, a shaft carried by the ball race and having universal joint elements disposed at each end, a second housing similar to the first, a second shaft rotatably mounted in the second housing, means for securing the housings together so that the shafts are angularly disposed, and universal joint elements mounted at the ends of the second shaft, the adjacent universal elements of the two shafts being interconnected.

5. In combination, a plurality of housings having ends inclined with respect to each other, the adjacent ends being secured together, shafts rotatably mounted in each housing and extending at angles to the shafts in the other housings, universal joint elements disposed at the ends of each shaft, the adjacent elements being interconnected for forming a drive.

6. In combination, a plurality of rigid housings, each housing having ends inclined with respect to each other, the ends being secured together, shafts rotatably mounted in each housing and extending at angles to the shafts in the other housings, universal joint elements disposed at the ends of each shaft, the adjacent elements being interconnected for forming a drive.

GEORGE S. COATS.